United States Patent
LeDuc et al.

(10) Patent No.: US 10,919,183 B2
(45) Date of Patent: Feb. 16, 2021

(54) METHOD FOR ENGINEERING THREE-DIMENSIONAL SYNTHETIC VASCULAR NETWORKS THROUGH MECHANICAL MICROMACHINING AND MUTABLE POLYMER MICROMOLDING

(71) Applicant: CARNEGIE MELLON UNIVERSITY, a Pennsylvania Non-Profit Corporation, Pittsburgh, PA (US)

(72) Inventors: Philip R. LeDuc, Wexford, PA (US); O. Burak Ozdoganlar, Sewickley, PA (US); Mary E. Wilson, Baltimore, MD (US); Emrullah Korkmaz, Pittsburgh, PA (US); Yadong Wang, Pittsburgh, PA (US); Donna Beer-Stolz, Pittsburgh, PA (US)

(73) Assignees: CARNEGIE MELLON UNIVERSITY, a Pennsylvania Non-Profit Corporation, Pittsburgh, PA (US); University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 108 days.

(21) Appl. No.: 14/750,620

(22) Filed: Jun. 25, 2015

(65) Prior Publication Data
US 2015/0376595 A1     Dec. 31, 2015

Related U.S. Application Data

(60) Provisional application No. 61/998,388, filed on Jun. 26, 2014.

(51) Int. Cl.
| C12N 11/04 | (2006.01) |
| B29B 11/14 | (2006.01) |
| B29C 33/38 | (2006.01) |
| B29L 31/00 | (2006.01) |
| B29L 23/00 | (2006.01) |

(52) U.S. Cl.
CPC .......... *B29B 11/14* (2013.01); *B29C 33/3842* (2013.01); *B29L 2023/00* (2013.01); *B29L 2031/756* (2013.01); *B29L 2031/7534* (2013.01)

(58) Field of Classification Search
CPC ........................... B29B 11/14; B29C 33/3842
See application file for complete search history.

(56) References Cited

U.S. PATENT DOCUMENTS

2006/0254916 A1* 11/2006 Hernandez ........ B01L 3/502707
                                                                204/453

OTHER PUBLICATIONS

Golden et al., Fabrication of microfluidic hydrogels using molded gelatin as a sacrificial element, Lab on Chip, vol. 7, p. 720-725, 2 (Year: 2007).*
Land et al., Low cost fabrication and assembly process for re-usable 3D polydimethylsiloxane (PDMS) microfluidic networks, Biomicrofluidics, vol. 5 036502 (Year: 2011).*
Dennir et al., Characterization of polymeric microneedle arrays for transdermal drug delivery, PLOS One, vol. 8, p. 1-9 (Year: 2013).*
Lee et al, Solvent compatibility of Polydimethylsiloxane-based microfluidic devices, Analytical Chemistry, vol. 75, p. 6544-6554. (Year: 2003).*
Polydimethylsiloxane, FNP52, p. 1-5 (Year: 1992).*
Wilson, Mary E. et al., "Fabrication of circular microfluidic channels by combining mechanical micromilling and soft lithography." Lab on a Chip 11, No. 8 (2011): 1550-1555.

\* cited by examiner

*Primary Examiner* — Renee Claytor
*Assistant Examiner* — Tiffany M Gough
(74) *Attorney, Agent, or Firm* — Michael G. Monyok

(57) ABSTRACT

The present invention relates generally to a method that is used to create three-dimensional synthetic vascular networks. Micromachining and molding techniques are used to create a template in a shape that mimics a biological network. Cellular material can be seeded around the template or a space created by the template and grown into an engineered tissue-construct.

15 Claims, 10 Drawing Sheets

METHOD FOR ENGINEERING THREE-DIMENSIONAL SYNTHETIC VASCULAR NETWORKS THROUGH MECHANICAL MICROMACHINING AND MUTABLE POLYMER MICROMOLDING

CROSS-REFERENCE TO RELATED APPLICATIONS

This application claims the benefit under 35 U.S.C. § 119 of U.S. Provisional Application Ser. No. 61/998,388, filed Jun. 26, 2014, which is incorporated by reference herein in its entirety.

STATEMENT REGARDING FEDERALLY SPONSORED RESEARCH

This invention was made with government support under FA9550-13-1-0108 awarded by the US Air Force Office of Scientific Research; W81XWH-11-2-0215 awarded by the US Army/Pittsburgh Tissue Engineering Initiative; and CMMI0856187 awarded by the National Science Foundation. The government has certain rights in the invention.

BACKGROUND OF THE INVENTION

The invention relates generally to a method for creating a vascular structure for use in tissue engineering. More specifically, the invention relates to a method for fabricating a machined substrate for creating molds that mimic a natural vascular structure in size and geometry, the molds being used to create living cellular structures.

There is great need for strategies to treat large-scale tissue loss. From major trauma to disease-related organ failure, the lives of many could be positively impacted by the ability to repair or regenerate large-scale tissues and organs. Among military service members, blast, blunt and penetrating traumas from modern warfare often results in devastating and complex injuries to organs and organ systems and frequently lead to mortality. Advanced regenerative medicine treatment options to heal severely wounded veterans are of great importance.

Organ failure contributes to significant morbidity and mortality in the United States and around the world, contributing to the health care costs of those affected. Currently, over 110,000 people in the United States are on the organ transplant waiting list, with kidney and liver being in highest demand. However, there is a major supply/demand discrepancy as only about 28,000 people per year receive a life-saving transplant. Unfortunately, a high percentage of patients will die while awaiting a suitable organ. As cadaver and living donor sources are inadequate, regenerative medicine strives to solve the donor organ shortage problem by means of engineering functional vital organs.

In addition to clinical application in organ replacement, an engineered three-dimensional synthetic organ module could also have implications for use as an in vitro diagnostic assay platform—for example, in testing of drug and vaccines first-in-human studies. Current in vitro platforms fail to predict the safety, efficacy and pharmacokinetics of drugs and vaccines in humans, and animal models are only slightly better in terms of prognostic ability with orders-of-magnitude increase in cost. One solution to this problem is to put the human physiology into an in vitro format that enables accurate, reproducible, high content diagnostics across the major organ systems.

As an evolving interdisciplinary field, tissue engineering has already produced artificial life-saving tissues. For example, functional tissue-engineered constructs have been developed and implanted in vivo to replace tissues such as skin, cartilage, and bladder. However, these products are not vital organs with high metabolic demands. Tissue engineering is limited to thin layer tissues due to a lack of means to vascularize metabolically demanding cells. As a first step in solving the donor organ shortage crisis, bioengineered vasculature from the micro- to macro-scale would provide an enabling technology for vital organ engineering. Though progress has been made in vascular engineering, existing approaches to address this challenge remain inadequate. It would therefore be advantageous to successfully create a complete three-dimensional microvasculature capable of delivering nutrients and oxygen while removing wastes for use in many different types of organs.

BRIEF SUMMARY OF THE INVENTION

According to embodiments of the present invention is a method to fabricate vascular-mimetic microfluidic channels using mechanical micromachining in combination with a polymer molding process. In one embodiment, a pattern of a vascular structure is machined into a substrate using a micromilling apparatus. The substrate is used to create molds of the vascular network. Two molds, each representing one half of a vascular structure, are joined together to create an enclosed space having a circular cross-section. A template of the vascular structure is created by injecting a fluid into the space and hardening the fluid. The template is then encased in a growth medium and dissolved or liquefied, creating a cavity in the medium substantially in the shape of the vascular network. The cavity is then perfused with cellular material. Various testing techniques can be used to assess the viability of the constructs.

The method of the present invention allows a three-dimensional vascularized tissue module to be grown in which capillaries are completely surrounded by parenchymal cells. The vascularized tissue module serves as a means to enable engineering three-dimensional tissues with clinically-relevant dimensions. The method of the present invention, which allows the development of capillary networks that form close contacts with parenchymal cells, overcomes limitations of conventional fabrication methods for creating microchannel features within materials systems. This method allows one to precisely define and engineer complex vascular microarchitectures within a cellularized tissue construct through bottom-up approaches combing three key advantages: (1) mechanical micromachining to define and create complex vascular-mimetic architectures; (2) mutable polymer micromolding, including water-dissolvable and thermally-reversible polymer systems, to enable precise placement of materials and cells within the defined micro-architectures; and (3) precision assembly techniques to facilitate manipulation and alignment of complex micro-architectures in three-dimensional space.

This invention represents a significant advance in microvasculature engineering and impact tissue engineering for many organs including but not limited to, the liver, kidney, heart, lung, and brain.

DETAILED DESCRIPTION OF THE INVENTION

Figure 1:
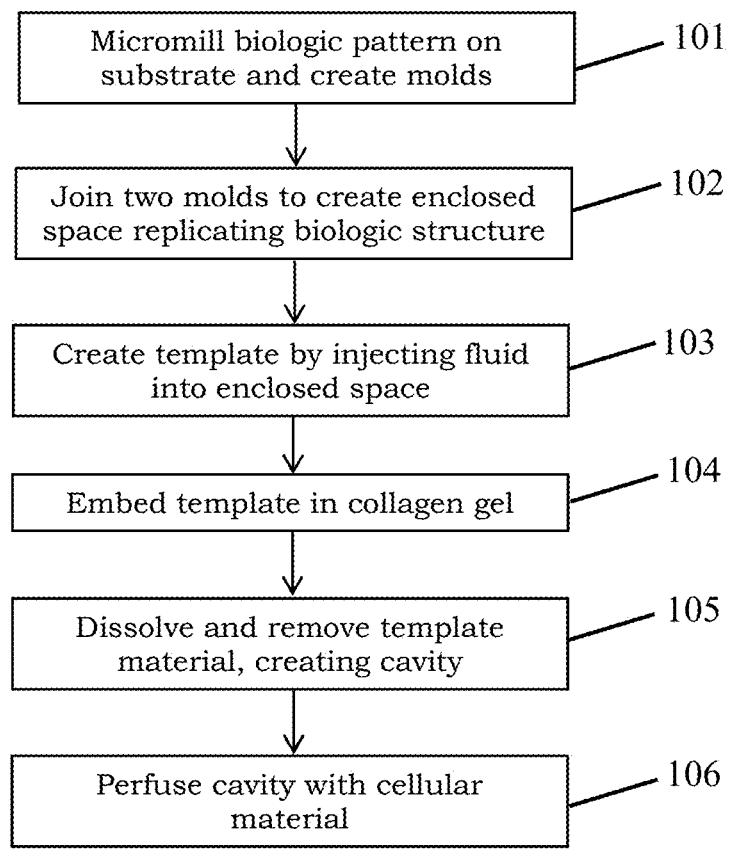
FIG. 1 is a flowchart of the method of the present invention according to one embodiment.
Figure 2:
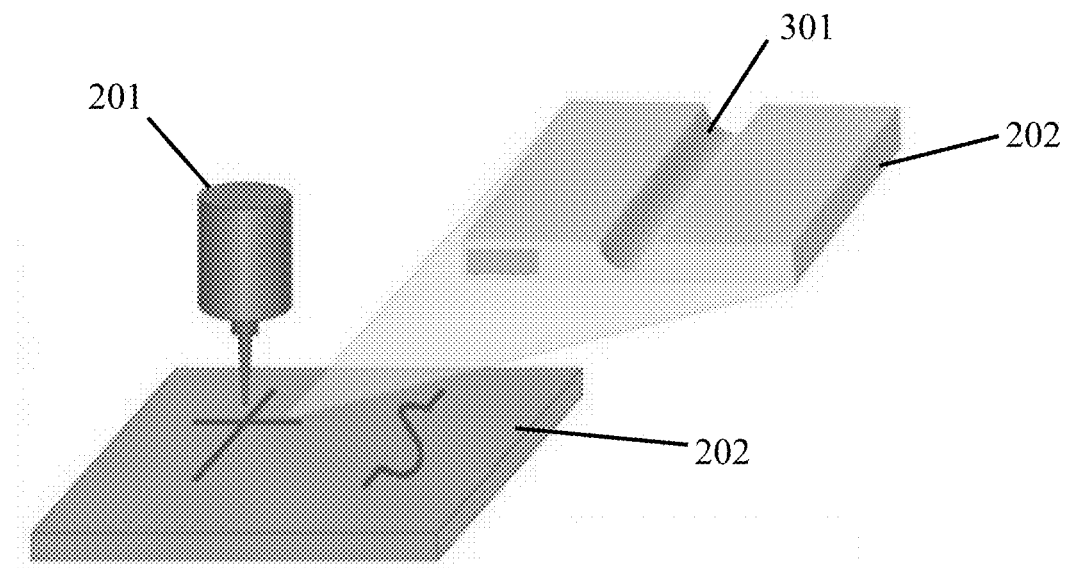
FIG. 2 depicts a machined substrate.
Figure 5:
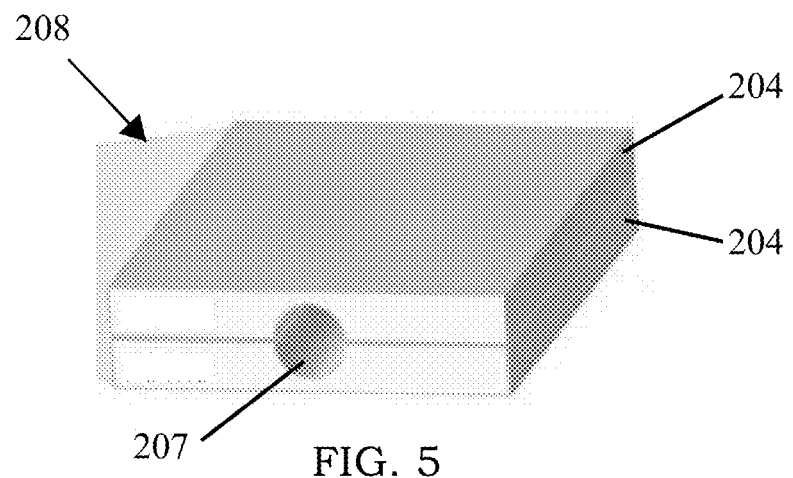
FIG. 5 is an image showing a micromold having a microchannel formed by joining and aligning two negative molds.
Figure 6:
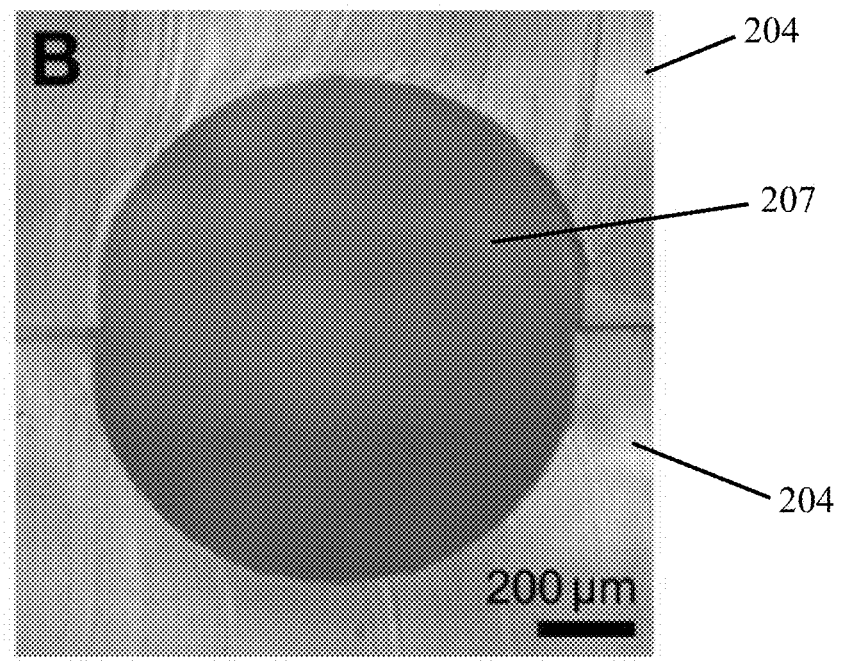
FIG. 6 is an image showing the circular cross-section of the microchannel.

Embodiments of the present invention and its advantages are best understood by referring to the figures. FIG. 1 is a flowchart showing the steps of the method according to one embodiment. At step 101, a vascular pattern is machined onto the surface of a substrate 202. In the preferred embodiment, the substrate 202 is metal, such as brass or aluminum. The substrate 202 is machined to create semi-circular patterns that correspond to one-half of a circular blood vessel. A semi-circular groove 301 machined on the surface of the substrate 202 can be seen in FIG. 2. As shown in FIGS. 5 and 6, when matching semi-circular depressions 301 are aligned, a microchannel 207 having a circular cross-section is created and mimics the cross-sectional shape of a blood vessel.

In the preferred embodiment, a high-precision miniature machine tool 201 with a 160,000 rpm air-turbine, air-bearing spindle, and micro end mill are used for the machining step. Miniature cutting tools, having a diameter as small as 10 microns, can be used. In the preferred embodiment, a four-fluted ball nose micro-end mill with a 508 micron nominal radius and TiAlN coatings are used to create the grooves 301 in the substrate 202.

Figure 7:
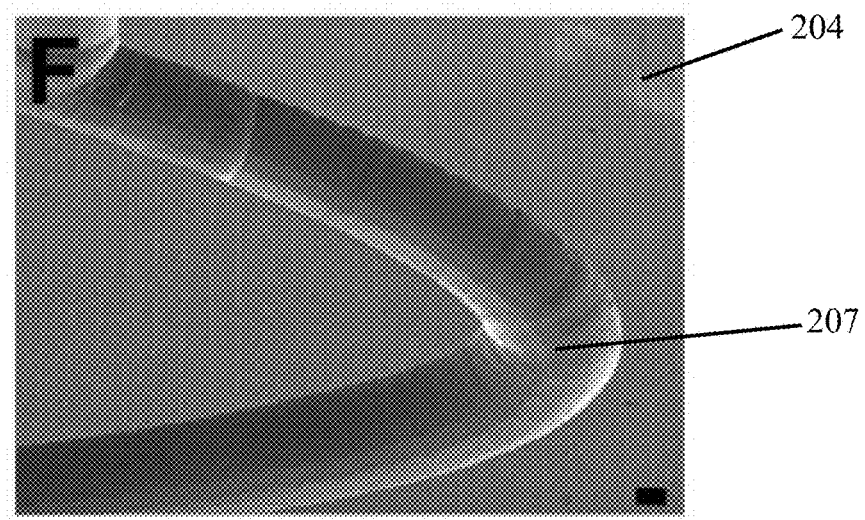
FIG. 7 shows a curved microchannel formed in a mold.

An end mill with a ball end is used in the preferred embodiment because it creates a semi-circular depression 301 in the substrate 202. Unlike three-dimensional lithography methods, for example, that are limited by a minimum step size in producing pseudo-curvature, both straight and S-shaped micromilled grooves 301 are continuously curved to form a semi-circular cross-section. FIG. 7 shows the semi-circular cross-section along an S-shaped groove 301.

During milling, feed motions of the substrate 202 can be controlled using a computer and a three-axis slide. A person having skill in the art will recognize that various micromilling control techniques can be used.

Figure 3:
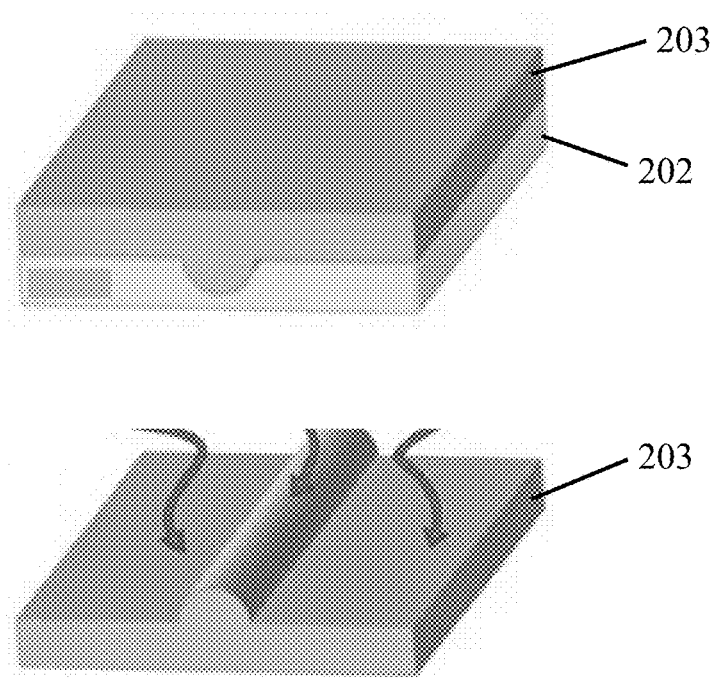
FIG. 3 shows a positive mold cast on the substrate and the positive mold removed from the substrate.

After machining, step 101 includes a two-step reverse molding process used to transfer the pattern from the substrate 202 to a dissolvable negative mold 204. As a first step of the molding process, a positive mold 203 is created from the substrate 202, wherein the mold material fills the grooves 301 in the substrate 202 created during the machining process. The top image of FIG. 3 shows the positive mold 203 formed on the substrate 202 and the bottom image shows the positive mold 203 removed from the substrate 202.

Figure 4:
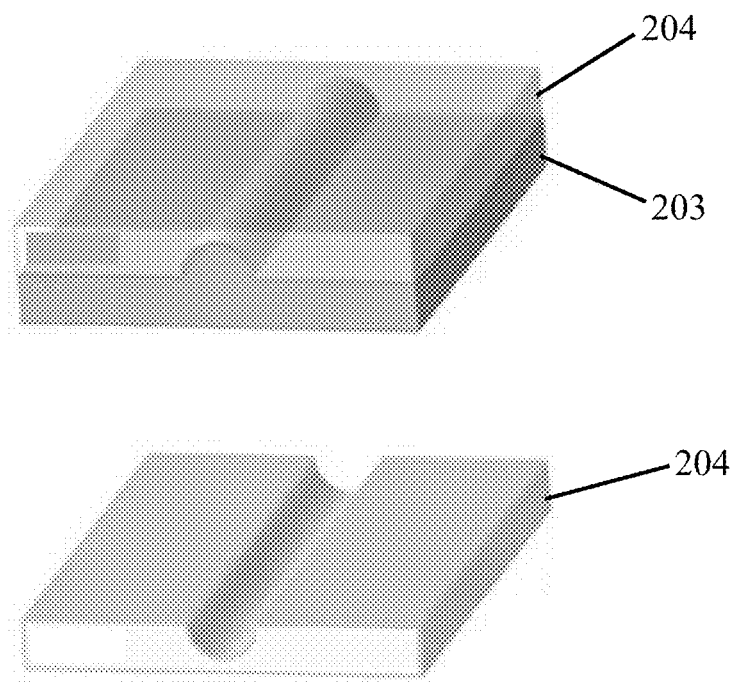
FIG. 4 shows a negative mold cast on the positive mold and the negative mold removed from the positive mold.

Next, a negative mold 204 is created from the positive mold 203. Referring to FIG. 4, the top image shows the negative mold 204 created on the positive mold 203 with the bottom image showing the negative mold 204 removed from the positive mold 203. In one respect, the substrate 202 serves as a master mold. However, the two-step molding process is used because the negative mold 204 is created from a material that can be dissolved or liquefied at a temperature that does not affect a second fluid or gel contained within the microchannels 207 of the negative mold 204. In the preferred embodiment, the negative mold 204 is created from polydimethylsiloxane (PDMS), but other dissolvable polymers can be used.

Figure 17:
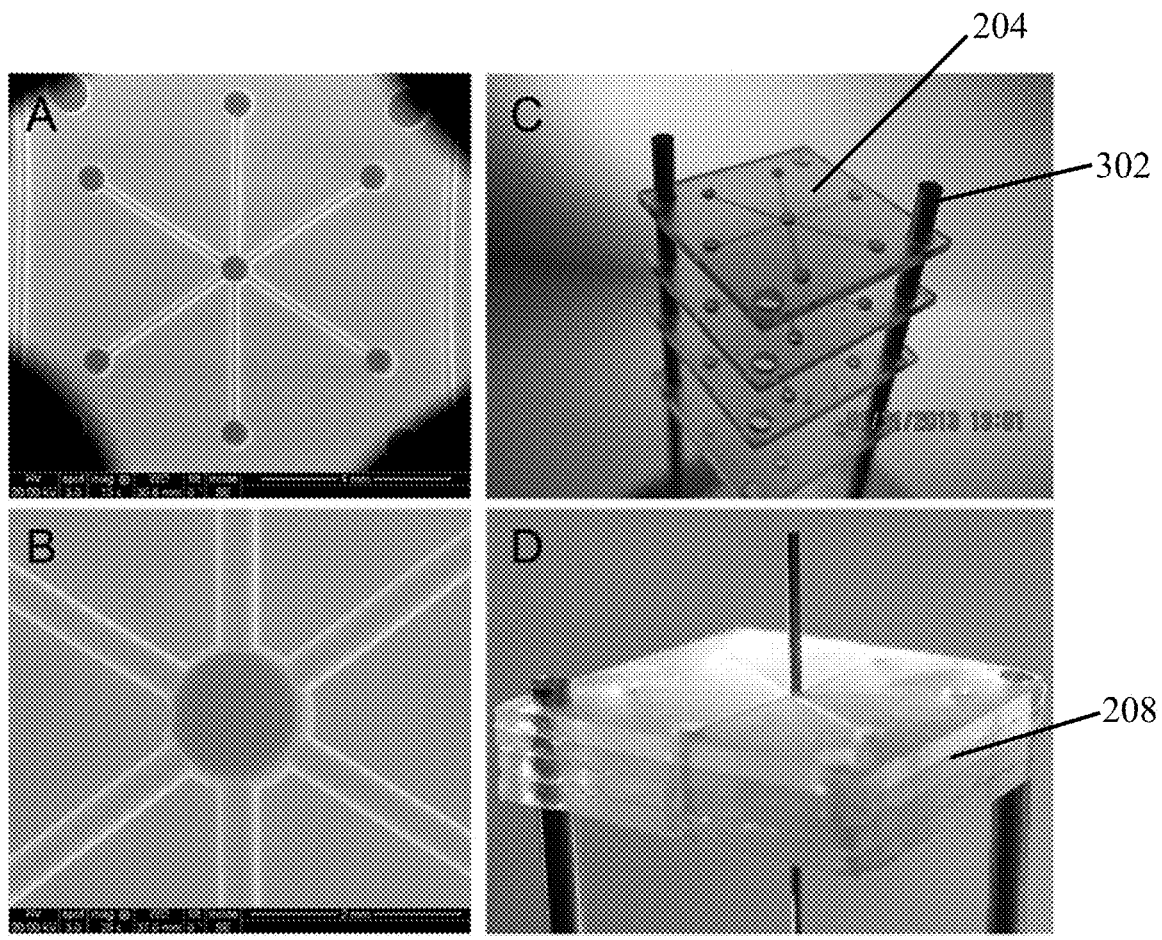
FIG. 17 illustrates the fabrication of a stacked three-dimensional dissolvable polymer micromold using CMC.

In alternative embodiments, grooves 301 forming a vascular network are machined directly onto the negative mold 204, obviating the need for a master mold, or substrate 202. FIG. 17 is a series of images of a lobule-mimetic vascular pattern directly machined on smooth carboxymethylcellulose (CMC) sheets. The images in the first column are scanning electron microscope characterizations. The second column of images shows multiple negative molds 204 aligned using precision guidance pins 302 and adhered to create a stacked, three dimensional vascular network micromold 208.

Figure 16:
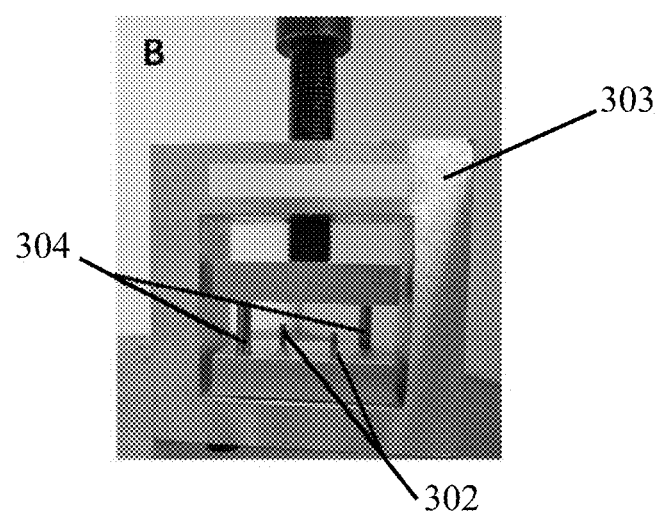
FIG. 16 illustrates a precision alignment device to facilitate alignment and sealing between multiple CMC layers.

After creating the negative molds 204, at step 102 a micromold 208 is created by joining at least two negative molds 204. To ensure the cross-section of the space created by adjoining grooves 301 has a circular cross-section, the two negative molds 204 must be precisely aligned. Alignment can be aided by the use of a microscope and fiducial features. Alternatively, alignment pins 302 can be used. FIG. 16 shows a clamp 303 having alignment pins 302 disposed on one surface of the clamp 303 and guide rods 304. It should be noted that for curved patterns, on each negative mold 204 the patterns will be mirror images of each other.

Next, at step 103, the vascular-mimetic micromolds 208 are utilized to mold a vascular network template 205 by flowing a fluid, or template material 209, into the microchannels 207 of the micromold 208. The template material 209 is a material that can be changed from a flowable to a hardened state, and then reversed to a flowable state again.

In the preferred embodiment, the material 209 is gelatin, a thermally reversible polymer. Gelatin is used because it is (1) biocompatible or bioinert, (2) a solid phase at 4° C., (3) and a liquid at 37° C. (body temperature). While gelatin is used for the template material 209 in the preferred embodiment, any thermally reversible polymer that is biocompatible, in liquid form at body temperature (37° C.), and becomes a gel below room temperature (25° C.) can be used. Examples of thermally reversible polymers meeting these requirements include polyester waxes and biodegradable copolymer compositions. A thermally reversible polymer having a specific temperature profile is used because—as will be explained in greater detail—using higher temperatures could damage the cellular material contained in a growth medium 206, in which the template 205 will be embedded.

Figure 8A:
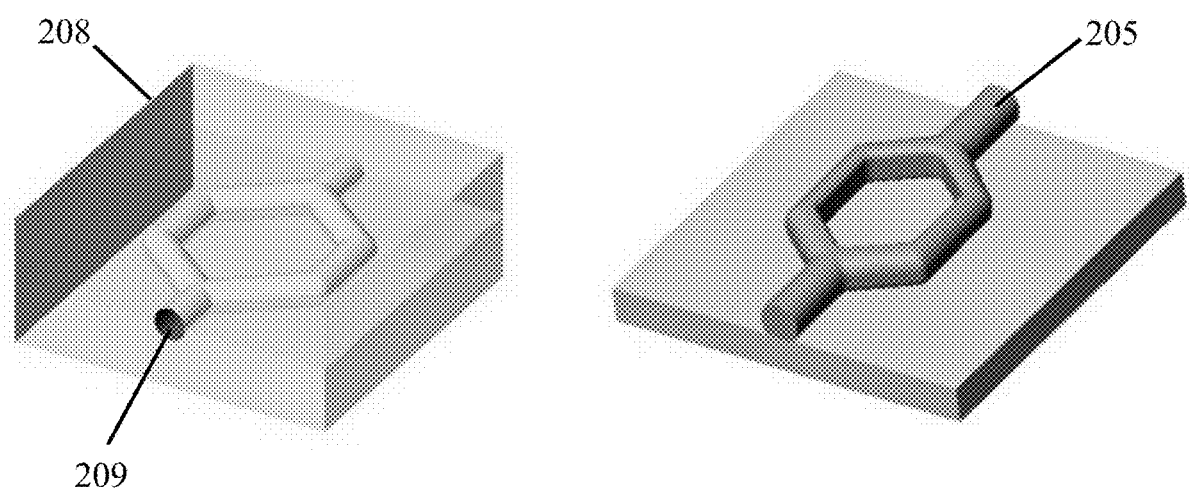
FIG. 8A shows the creation of a template from the micromold.

Once the template material 209 is flowed into the microchannels 207 of the dissolvable micromold 208, the material 209 is hardened. In the preferred embodiment, the chemical composition of the dissolvable polymer has a dissolution rate chosen so that the dissolution of the micromold 208 does not occur during fluid flow. In other words, the fluid can be flowed into the microchannels 207 and cooled, forming a template 205 before the micromold 208 dissolves and the microchannels 207 collapse. After flowing the fluid into the microchannels 207, the temperature of the micromold 208 and template material 209 is then decreased to allow for complete gelation of the template material 209, and the polymer micromold 208 is dissolved, thus leaving the structure of the gelled or hardened template material 209, which serves as the vascular template 205. FIG. 8A depicts the template material 209 flowed into the micromold 208 in the image on the left, and the template 205 after dissolving the micromold 208 and hardening the template material 209 in the image on the right.

In the preferred embodiment, in which a thermally reversible polymer is used as the template material 209, the temperature of the micromold 208 and fluid are reduced to about 4° C. However, the temperatures can vary depending on the materials used for the micromolds 208 and template material 209.

At step 104, the biologic template 205 is then embedded within a hepatocyte-seeded collagen gel 206, for example, to create a vascular microarchitecture within the growth medium scaffold. Depending on the tissue to be used with the vascular structure, other types of cells can be seeded in the collagen gel or other growth medium 206. This embedding step 104 is performed near room temperature so that the vascular template 205, made of a thermally reversible polymer, is maintained as a solid, while allowing for collagen pre-gelation.

After embedding the template 205, at step 105, the temperature is increased to allow for complete gelation of the growth medium 206 and melting of the vascular template 205 back to liquid form, creating a perfusable vascular cavity 210 within the scaffold. In the preferred embodiment, the growth medium 206 is a collagen material and the temperature is increased to 37° C., a temperature at which the thermally reversible polymer becomes a liquid.

Figure 8B:
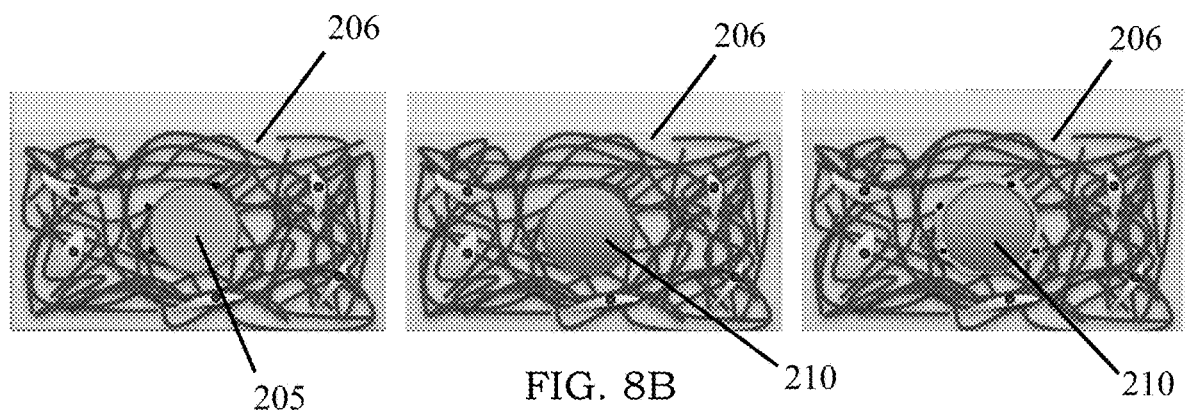
FIG. 8B illustrates the creation of an example vascularized co-culture construct from the template.

Finally, at step 106 cellular material is perfused into the cavity 210. In the preferred embodiment, endothelial cells (ECs) are seeded into the perfusable cavity 210 within the gelled collagen scaffold 206 to form vascularized co-culture construct. FIG. 8B shows the various stages of the construct. The image at the left of FIG. 8B shows the template 205 embedded in a growth medium 206 containing hepatocytes. In the middle image, the template 206 has been liquefied and the cavity 210 perfused with a liquid containing a cellular material, such as endothelial cells for example. The image at the right of FIG. 8B shows endothelial cells growing on the inner surface of cavity 210, wherein the endothelial cells are surrounded by hepatocytes in the growth medium 206.

Endothelial cells are used as an example of cells to be used in creating vascular tissue in the preferred embodiment. However, the method can be used to create other web-like tissues, such as nerves. If the method is being used to create innervated tissue scaffolding, cells such as neurons, axons, and other neural cells would be used instead of endothelial cells.

Figure 9:
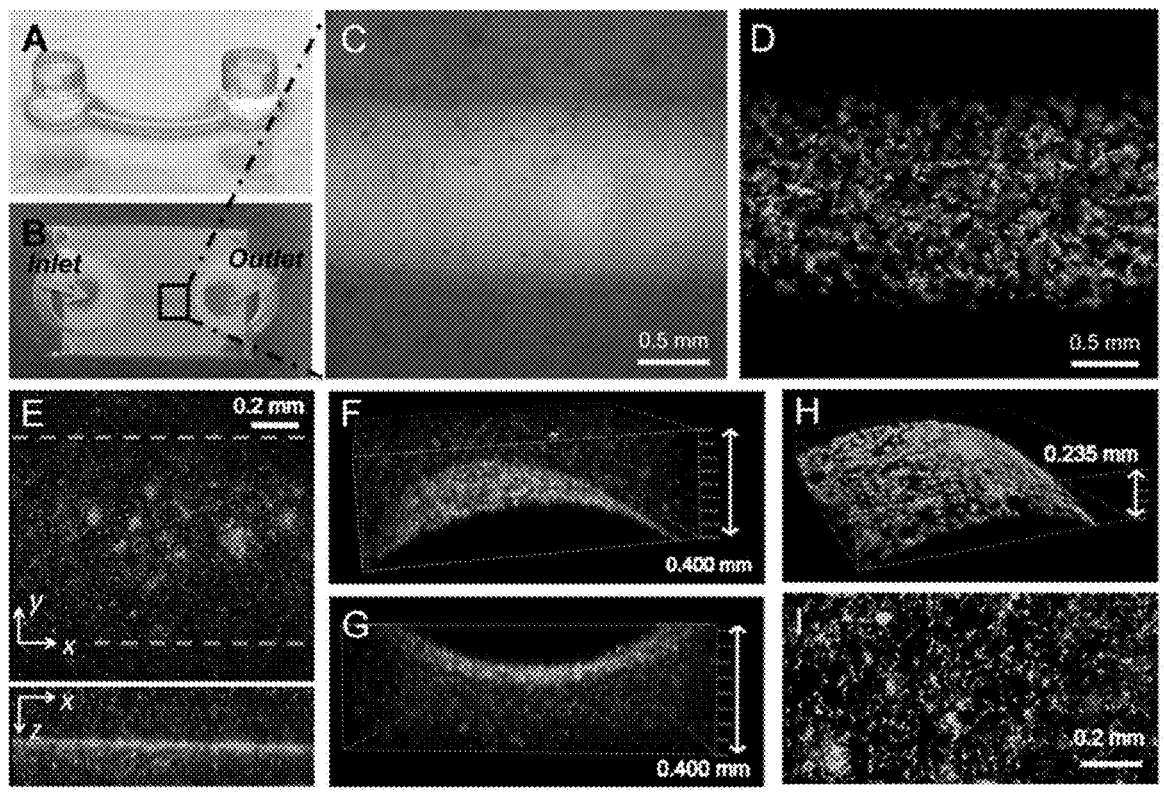
FIG. 9 is a series of images showing the distribution of cells on an interior surface of a microchannel.

To assess the viability of a biologic construct, various analytical techniques can be used. For example, FIG. 9 shows various images of fluorescent beads flowed through cavity 210. The bottom image in the first column shows a single layer vascular network co-culture system that contains hepatocytes seeded within the collagen gel 206 and endothelial cells cultured inside the vascular channel comprising cavity 210, shown in two views: top x-y plane and side x-z plane. A three-dimensional reconstruction of the construct via fluorescent confocal microscopy shows vascular-mimetic architecture and close interactions between hepatocytes and endothelial cells. Moreover, endothelial cells and hepatocytes remain viable within the collagen construct after seeding.

In one embodiment of the method, hepatocytes and endothelial cells can be seeded within the growth medium 206, or micropatterned type I collagen hydrogels in this particular embodiment, during cavity 210 fabrication. First, hepatocytes are suspended within the collagen solution prior to gelation at an optimized seeding density (5×106 cells per mL) in order to obtain uniform and adequate distribution of hepatocytes (HepG2 cells) throughout the collagen scaffold growth medium 206. Next, after one or two days of culturing the hepatocyte-seeded vascular construct, endothelial cells (ECs) (specifically HUVECs) are seeded into the vascular channel, or cavity 210, in two-step process—first, a concentrated solution of endothelial cells is injected into the cavity 210 and incubated for a period of 12-24 hours to allow for cell attachment on the bottom half of the cavity 210, and then a second concentrated solution of endothelial cells is injected into the cavity 210 and subsequently inverted to allow attachment to the top half of the cavity 210.

To visually confirm attachment of the two cell types, hepatocytes can be labeled with CellTracker Orange, which remains within the cytoplasm of stained cells, and endothelial cells can be labeled with wheat germ agglutinin-488 (WGA-488), which binds specific lectin glycoproteins on the endothelial cell surface.

Vascular architecture and cellular distribution are assessed via fluorescent confocal microscopy. Referring again to FIG. 9, the single-layer vascular channel within the collagen construct is the expected diameter, roughly 1 mm, as indicated by the presence of fluorescent endothelial cells across the cavity 210 diameter (marker by the dashed lines; top view of projected intensities on the x-y plane). Confocal reconstructions reveal that hepatocytes and endothelial cells are well distributed within the appropriate locations. Hepatocytes have a uniform distribution through the volume of the collagen gel and are in direct contact with the endothelial cells lining the channel (side view of protected intensities on the x-z plane). In addition, reconstructions of the second image and bottom image in the second column in FIG. 9 of the vascular cavity 210 reveal that endothelial cells are attached to and cover the majority of cavity 210 interior surfaces one day post-seeding. Confocal stacks are analyzed to give projected cell intensity across the channel diameter as a means to assess cellular distribution.

Cell viability of both hepatocytes and endothelial cells within the collagen construct can be assessed through a Live/Dead Cell Viability assay, shown in the bottom two images in the third column of FIG. 9. After one day in culture after final HUVEC seeding, HUVECS on both the top and bottom surfaces of the collagen cavity 210 remain viable during the seeding and cell attachment process. Hepatocytes within the collagen gel growth medium 206 closest to fresh nutrients and media remain viable over time; however, hepatocytes in the bulk collagen gel do not remain fully viable, likely due to lack of vascularization.

Figure 10:
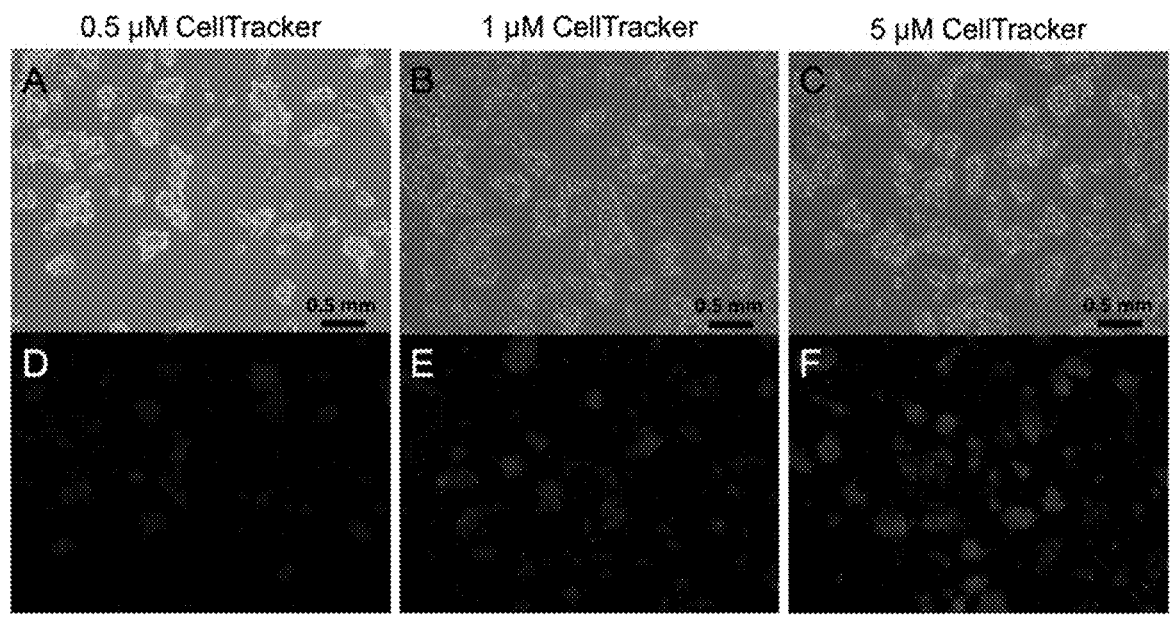
FIG. 10 illustrates HepG2 cells stained with a range of CellTracker Green BODIPY concentrations: 0.5 µM (A), 1 µM (B), and 5 µM (C).
Figure 11:
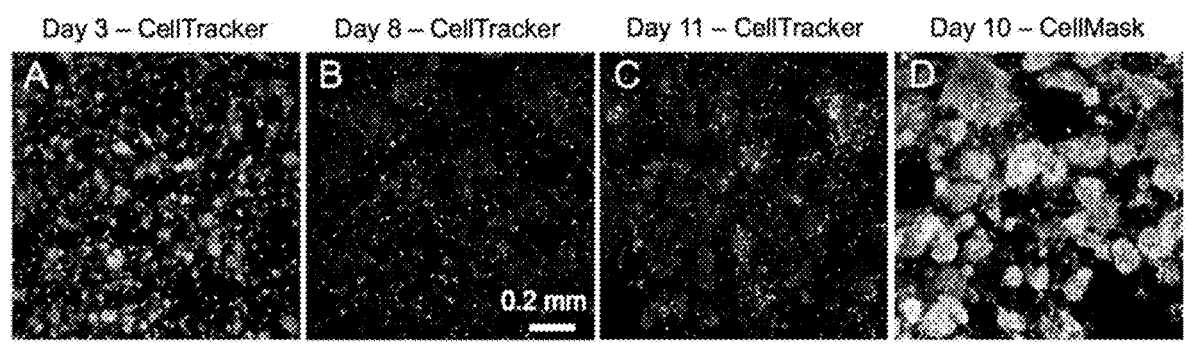
FIG. 11 illustrates the longevity of live cell staining of HepG2 cells with 5 µM CellTracker Orange prior to cell seeding in collagen gel.
Figure 12:
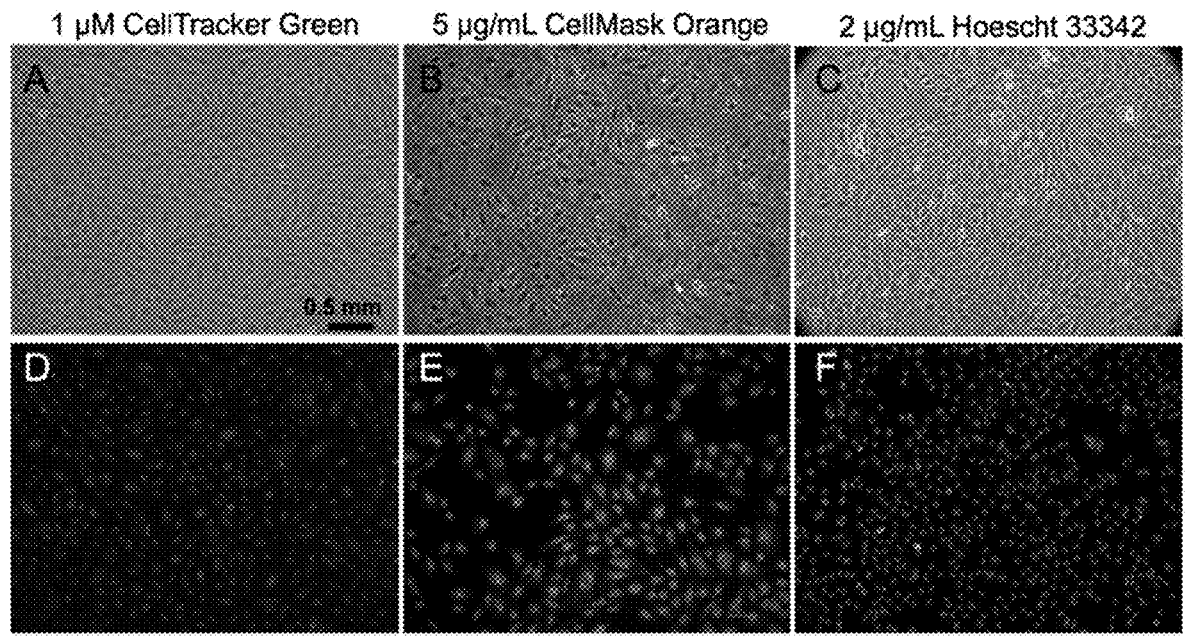
FIG. 12 illustrates alternative staining methods tested for HUVECs: CellTracker Green BODIPY at 1 µM in serum-free media for 45 minutes (A); CellMask Orange at 5 µg/mL in PBS for 10 minutes (B); and Hoescht 3342 at 2 µg/ml in PBS for 2 minutes (C).

Cell tracking using live cell imaging dyes is another analysis that can be performed to assess the construct. For example, cellular morphology, migration, and proliferation over time can be tracked through the use of live cell stains. The use of Invitrogen CellTracker dyes can be used to label live cells prior to seeding within the co-culture system (i.e. hepatocytes could be pre-labeled orange, while endothelial cells could be pre-labeled green). Several different CellTracker dye concentrations to ensure viability of hepatocytes and endothelial cells in culture can be used. As shown in FIG. 10, HepG2 cells are stained with three concentrations of CellTracker Green BODIPY (Invitrogen)—0.5 µM, 1 µM, and 5 µM—for 45 minutes, which resulting in a range of fluorescence intensities. However, a dye concentration between 1-5 µM is optimal, as the lowest concentration (0.5 µM) results in weak fluorescent signals over time. 5 µM working solutions for all CellTracker dyes (Orange CMTMR, Green BODIPY, and Blue CMHC) for staining HepG2 cells are shown in FIG. 10; FIG. 11, and HUVECs in FIG. 12.

Alternative methods of specific cell labeling can be used to confirm that cells remain viable to allow for optimal functionality of cells within a tissue-engineered system. These alternative methods included WGA-488 (Wheat Germ Agglutinin, Alexa Fluor® 488 Conjugate; Invitrogen) labeling of HUVECs prior to cell seeding. In addition, two stains can be used to image cells immediately prior to imaging. CellMask Orange (Invitrogen) at 5 µg/mL in PBS for 10 minutes can be used to label the plasma membrane of HepG2 cells and/or HUVECS immediately before imaging, as shown in the image in the middle column, top row of FIG. 12. Hoescht 33432 (Invitrogen) at 2 µg/mL in PBS for 2 minutes can be used to label the nucleus of HepG2 cells and/or HUVECS prior to imaging, as shown in the image in the last column, top row of FIG. 12.

Figure 13:
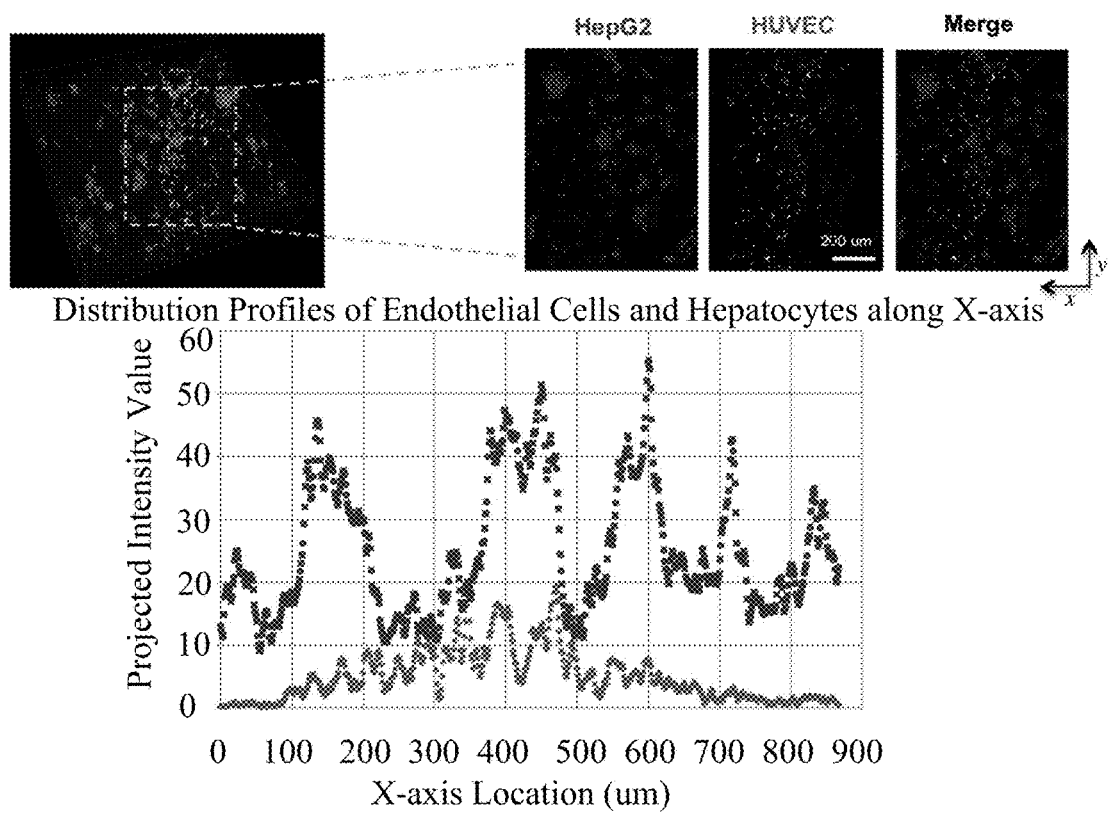
FIG. 13 illustrates the distribution of endothelial cells and hepatocytes across the vascular channel diameter (x-axis) by analysis of confocal microscopy data.

To assess localization and abundance of cells seeded within the vascularized co-culture construct, distribution of cells around the channel can be assessed via quantitative image analysis. Confocal stacks through the cell-populated channel are projected onto the x-z plans, as depicted in FIG. 13. This allows for analysis of project fluorescent intensity values as a metric of hepatocyte and endothelial cell distributions across the cavity 210 diameter (x-axis). If the cells were seeded in the expected locations, but in too low of a density (as shown in FIG. 13), cell seeding can be improved by concentrating both cell types by centrifugation and resuspension in a small volume of medium prior to cell seeding. The concentration of hepatocytes within the collagen solution can be increased a significant amount from 7×105 cells per mL to 2-5×106 cells per mL. To improve endothelial cell seeding within the cavity 210, cells can be seeded in a two-step process.

Figure 14:
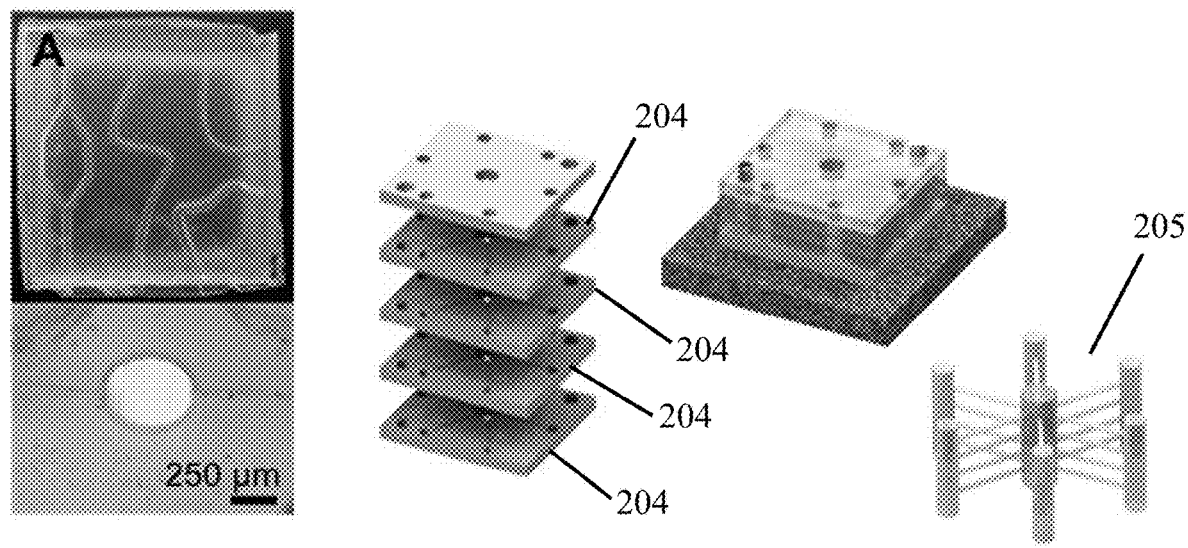
FIG. 14 illustrates micromolds formed by aligning and adhering two half-circular molds, optical micrograph demonstrating the formed circular cross-section at a channel opening, and a structural design for scalable and stackable three-dimensional micromolds.

The method so far described can be used to fabricate three-dimensional vascularized tissues using a PDMS as a mold 204 material. In an alternative embodiment, carboxymethlycellulose (CMC), a water-soluble polymer is used as the polymer for the mold 204. This fabrication method can be scaled to build a three-dimensional channel network within CMC, and the structures micromachined in poly(methyl methacrylate) (PMMA), a polymeric material, and used to mold a stackable three-dimensional CMC channel system, as shown in FIG. 14. This three-dimensional CMC microfluidic channel network can be used to mold three-dimensional gelatin vascular templates 205. In this example, high strength (250 Bloom) gelatin at a concentration of 20% in distilled, deionized water is injected in hot liquid form into a single layer CMC channel and gelled at 4° C. for at least 30 minutes.

To release the three-dimensional channel, the CMC structure is placed in cold water, such that the CMC dissolves to leave behind a solid three-dimension gelatin template 205. Next, this gelatin template 205 is embedded within a hepatocyte-laden collagen gel 206 (as demonstrated with the single layer channel), and upon incubation near body temperature, the liquefied gelatin is flushed out to allow for seeding of endothelial cells within the channel network. In an alternative embodiment, direct fabrication of CMC micromolds 208 can be achieved through machining the vascular-mimetic patters directly onto a CMC substrate 202.

Figure 18:
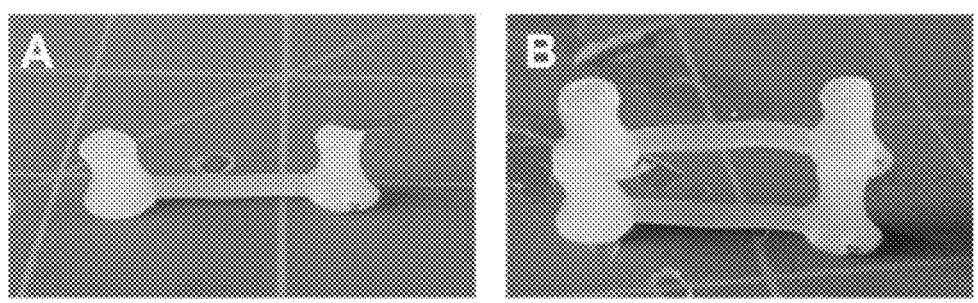
FIG. 18 illustrates an example of a vascular template made from a low melting point polyester wax that can maintain a rigid shape upon demolding, which is well suited for stacked three-dimensional structures.

For complex three-dimensional shapes, an alternative thermally reversible material having increased stiffness as compared to gelatin, such as a low melting point polyester wax, can be used. FIG. 18 shows a template 205 constructed of polyester wax, which holds its shape after de-molding.

Figure 15:
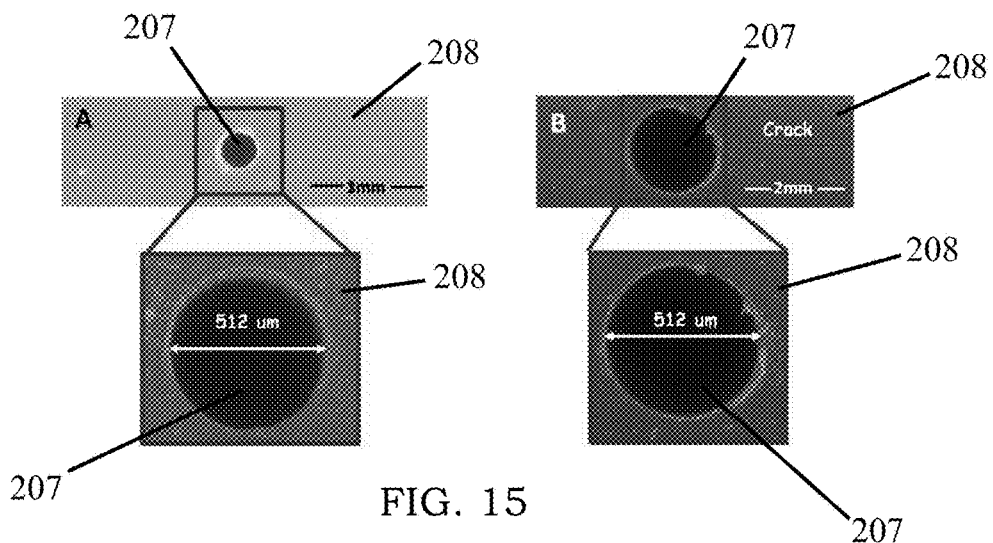
FIG. 15 illustrates CMC channel sealing using liquid CMC (A) and water (B) to seal the two CMC slabs.

For proper operation of the stacked fluid network, individual stacks must be sealed to create a fully circular microchannel 207, so that assemblies between the layers can be obtained. FIG. 15 shows an assembled channel, where, by sealing with a liquid layer of CMC (FIG. 15, left image) as opposed to water (FIG. 15, right image), channel 207 formation can be achieved without cracks. This method allows for stacking of multiple layers of CMC channels 207 that are well connected and perfusable. For this purpose, successive steps of wetting are used (using a CMC slurry between the channels) and load the assembly at high temperatures (>120° C.).

In addition to improved sealing between CMC layers, a precision alignment platform to enable accurate assembly of multiple CMC microchannels 207 through a layer-by-layer approach can be used. One embodiment of the assembly apparatus is shown in FIG. 16, with alignment pins 302 visible. Precision holes created on the CMC sheets are aligned with the pins 302, enabling assembly of each layer with single micron accuracy.

The methods and approach described herein can be extended to build other tissue platforms including cardiac, circulatory, endocrine, gastrointestinal, immune, integument, musculoskeletal, nervous, reproductive, respiratory, and urinary. The major components of this engineered platform can be applied to other tissues enabling the: (1) control of vasculature within co-culture systems; (2) ability to dictate structural position of multiple different cell types within the tissue in spatially localized and organized cell populations; (3) use of our conduits to introduce additional cell types such as neural cells in defined positions; (4) ability to scale-up significantly for larger scale production; and (5) design of modules with specific diagnostic function including integrated sensors and optical access for high throughput and/or high content screening.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method for creating a vascularized structure, comprising:
   milling a groove on a substrate, wherein the groove forms a pattern that mimics a biologic structure;
   transferring the pattern from the substrate to a first mold;
   transferring the pattern from the substrate to a second mold, wherein the second mold is a mirror image of the first mold;
   joining the first mold and second mold together, forming a micromold having a microchannel with a circular cross-section;
   flowing a template material into the microchannel, wherein the micromold has a dissolution rate that prevents dissolution of the micromold during flowing the template material;
   causing the template material to solidify in the microchannel;
   dissolving the micromold, leaving a template having a shape of the microchannel;
   embedding the template in a growth medium;
   solidifying the growth medium;
   liquefying and then removing the template material, leaving a cavity in the growth medium in the shape of the template; and
   perfusing the cavity with cellular material.

2. The method of claim 1:
   wherein the biologic structure is a vascular network, and
   wherein the cellular material is endothelial cells.

3. The method of claim 1:
   wherein the biologic structure is a neural structure, and
   wherein the cellular material is neural cells.

4. The method of claim 3, further comprising:
   reducing a diameter of the microchannel before perfusing the cavity.

5. The method of claim 1, wherein the growth medium is a collagen gel seeded with a second cellular material.

6. The method of claim 1, wherein the template material comprises a thermally reversible polymer.

7. The method of claim 1, wherein the micromold is dissolvable in a solvent.

8. The method of claim 7, wherein the solvent is water.

9. The method of claim 1, wherein the micromold comprises polydimethylsiloxane.

10. The method of claim 1, wherein the micromold comprises carboxymethlycellulose.

11. The method of claim 1, wherein the template material is a gelatin solution.

12. The method of claim 1, wherein the template material is bioinert and is in a liquid phase at 37° C.

13. The method of claim 1, further comprising:
    assessing attachment of the cellular material to an interior surface of the cavity.

14. The method of claim 1, further comprising:
    creating at least one additional micromold having a second microchannel; and
    stacking the at least one additional micromold on top of the micromold, wherein the second microchannel is in fluid communication with the microchannel.

15. The method of claim 1, wherein the step of joining the first mold and second mold together, forming a micromold having a microchannel with a circular cross-section, further comprises:
    using an alignment pin to align the first mold and the second mold.

* * * * *